US012624232B2

(12) United States Patent
Furuya et al.

(10) Patent No.: US 12,624,232 B2
(45) Date of Patent: May 12, 2026

(54) METAL PRINTING INK COMPOSITION

(71) Applicant: SAKATA INX CORPORATION, Osaka (JP)

(72) Inventors: Takayuki Furuya, Osaka (JP); Takashi Araki, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 492 days.

(21) Appl. No.: 18/255,066

(22) PCT Filed: Oct. 28, 2021

(86) PCT No.: PCT/JP2021/039749
§ 371 (c)(1),
(2) Date: May 30, 2023

(87) PCT Pub. No.: WO2022/113629
PCT Pub. Date: Jun. 2, 2022

(65) Prior Publication Data
US 2024/0052182 A1 Feb. 15, 2024

(30) Foreign Application Priority Data

Nov. 30, 2020 (JP) ................................. 2020-198637

(51) Int. Cl.
*C09D 11/08* (2006.01)
*C09D 11/033* (2014.01)
*C09D 11/105* (2014.01)

(52) U.S. Cl.
CPC ........... *C09D 11/08* (2013.01); *C09D 11/033* (2013.01); *C09D 11/105* (2013.01)

(58) Field of Classification Search
CPC ..... C09D 11/08; C09D 11/033; C09D 11/105; C09D 11/104; C09D 11/037
See application file for complete search history.

(56) References Cited

U.S. PATENT DOCUMENTS

2018/0112024 A1* 4/2018 Ohashi ..................... C08G 8/34

FOREIGN PATENT DOCUMENTS

| CN | 105368134 | A | | 3/2016 | |
|---|---|---|---|---|---|
| EP | 1790700 | A1 | * | 5/2007 | ............... B41J 2/01 |
| EP | 4286170 | A1 | | 12/2023 | |
| JP | S57119965 | A | | 7/1982 | |
| JP | H01-001777 | A | | 1/1989 | |
| JP | H01-060670 | A | | 3/1989 | |
| JP | H0239048 | A | | 2/1990 | |
| JP | H05-040791 | B2 | | 6/1993 | |
| JP | H05-040792 | B2 | | 6/1993 | |
| JP | H05-075031 | B2 | | 10/1993 | |
| JP | 10-245513 | A | | 9/1998 | |
| JP | H11269421 | A | * | 10/1999 | |
| JP | 2005206686 | A | | 8/2005 | |
| JP | 2006077066 | A | * | 3/2006 | |
| JP | 2006225609 | A | | 8/2006 | |
| JP | 2009-249435 | A | | 10/2009 | |
| JP | 2015-221887 | A | | 12/2015 | |
| WO | WO-2017096912 | A1 | * | 6/2017 | ............. C09D 11/03 |

OTHER PUBLICATIONS

European Patent Office, Extended European Search Report Issued in Application No. 21897605.8, Sep. 18, 2024, 5 pages.

* cited by examiner

*Primary Examiner* — Robert S Jones, Jr.
*Assistant Examiner* — Joshua Caleb Bledsoe
(74) *Attorney, Agent, or Firm* — Alleman Hall LLP

(57) ABSTRACT

An ink composition for printing on metal including a coloring pigment, resins, and a solvent is employed, wherein the ink composition contains a rosin-modified resin having an acid value of 10 to 400 mg KOH/g as at least part of the resins, and the solvent contains at least one compound selected from the group consisting of compounds represented by general formula (1):

$$R-O-(AO)_n-H \qquad (1)$$

wherein each A is independently an alkylene group having 2 to 4 carbon atoms that may have a branch structure, R is an alkyl group having 1 to 13 carbon atoms that may have a branch structure and/or a ring structure, and n is an integer of 2 to 6.

6 Claims, No Drawings

METAL PRINTING INK COMPOSITION

TECHNICAL FIELD

The present invention relates to an ink composition for printing onto metal material.

BACKGROUND ART

In a printing process onto the outer surfaces of metal materials, such as zinc-coated or tin-coated iron plates, aluminum plates, or metal cans made of these metal materials, ink compositions for printing onto metal materials (thereafter, also referred to as "printing on metal") have been used which contain binder resins, such as alkyd resins, polyester resins, and epoxy resins, and mineral oils or organic solvents, such as higher alcohols, as main vehicle ingredients.

In addition, overprint varnishes are generally coated on such printed surfaces in order to improve various properties, such as adhesiveness, flexural resistance, impact resistance, and abrasion resistance, of the coated ink film. Widely used examples of such overprint varnishes are solvent-type varnishes, which are composed of binder resins, such as alkyd resins, polyester resins, acrylic resins, and epoxy resins, curing agents, such as melamine resins and benzoguanamine resins, and solvents, such as mineral oils and cellosolve-based organic solvents.

In the printing process onto the outer surface of a metal material, after printing using ink with an offset printing machine or a dry offset printing machine, the overprint varnish was applied on the ink film in a wet-on-wet manner with a coater, followed by baking at 150 to 280° C.

In recent years, from the viewpoints of air pollution caused by solvents as well as hygiene and safety in work environments for printing, water-based overprint varnishes have been generally used in place of the conventional solvent-type overprint varnishes also in the field of printing on metal. However, in the case that water-based overprint varnishes are applied onto the ink film composed of a conventional ink composition for printing on metal, various phenomena occur such as repellency of the water-based overprint varnish and penetration of the water-based overprint varnish into the ink film, resulting in a remarkable reduction in print qualities, such as gloss or adhesion of the coated film. Accordingly, the ink compositions have been required to have superior suitability for water-based overprint varnishes.

In order to improve the suitability of ink for such water-based overprint varnishes, several methods have been proposed. For example, PTL 1 discloses the use of a solvent containing alkylene glycol having 4 to 8 carbon atoms, PTL 2 discloses the use of a polyoxyalkylene glycol-based solvent, PTL 3 discloses the use of a polyoxyalkylene alkyl ether-based organic solvent, and PTL 4 discloses the use of a polyoxyalkylene alkyl ester-based solvent. Such organic solvents employed in ink compositions are effective in an improvement in suitability of the ink compositions for water-based overprint varnishes; however, the flowability of the ink compositions are often insufficient and misting tends to occur during printing, resulting in remaining room for improvements in such properties.

In the case that the flowability of ink compositions for printing on metal and the misting during printing are intended to be improved, a low-polarity solvent such as high-boiling point aromatic hydrocarbon may be used, for example, as disclosed in embodiments of PTL 5. For the purpose of a further reduction in environmental load, water-based overprint varnish products with reduced amounts of solvent ingredients to the utmost limit are commercially available at present, however, such water-based overprint varnishes may cause a drawback in repellency to the ink composition having the low-polarity solvent.

CITATION LIST

Patent Literatures

PTL1: JP H5-75031B
PTL2: JP H5-40791B
PTL3: JP H5-40792B
PTL4: JP 564-60670A
PTL5: JP 2009-249435A

BRIEF DESCRIPTION OF THE INVENTION

Problems to be Solved

As described above, a trade-off relationship holds between an improvement in the flowability of the ink composition or misting during printing and a reduction in repellency of the overprint varnish during application, which means that satisfactoriness at one side leads to unsatisfactoriness at the other side. An object of the present invention, which has been completed in view of such circumstances, is to provide an ink composition for printing on metal which has superior properties in terms of a reduction in repellency and improvements in flowability and misting even when a water-based overprint varnish containing reduced amounts of solvent ingredients is applied onto the printed surface with the ink composition.

Means to Solve Problems

The present inventors have made intensive studies, found that the use of an ink composition containing both a rosin-modified resin with an acid value of 10 to 400 mg KOH/g as at least part of the resins contained in the ink composition and polyoxyalkylene alkyl ether-based solvent represented by general formula (1) can solve the drawback described above, and completed the present invention. In particular, the present invention provides ink compositions described in the following aspects:

Aspect (1): The present invention provides an ink composition for printing on metal including a coloring pigment, resins, and a solvent, wherein the ink composition contains a rosin-modified resin having an acid value of 10 to 400 mg KOH/g as at least part of the resins, and the solvent contains at least one compound selected from the group consisting of compounds represented by general formula (1):

[Formula 1]

$$R\!-\!O\!-\!(AO)_{\overline{n}}\!-\!H \tag{1}$$

wherein each A is independently an alkylene group having 2 to 4 carbon atoms that may have a branch structure, R is an alkyl group having 1 to 13 carbon atoms that may have a branch structure and/or a ring structure, and n is an integer of 2 to 6.

Aspect (2): The present invention also provides the ink composition for printing on metal according to Aspect (1), wherein the rosin-modified resin is in the form of a gelled varnish together with the solvent and a di- or higher valent metal alkoxy compound in the ink composition.

Aspect (3): The present invention also provides the ink composition for printing on metal according to Aspect (1) or Aspect (2), wherein the solvent is 20 mass % or more of the entire ink composition.

Aspect (4): The present invention also provides an ink composition for printing on metal according to one of Aspects (1) to (3), wherein the rosin-modified resin contains a portion in the structure thereof derived from at least one selected from the group consisting of maleic acid, maleic anhydride, fumaric acid, and fumaric anhydride.

Aspect (5): The present invention also provides an ink composition for printing on metal according to any one of Aspects (1) to (4), wherein the ink composition further contains an alkyd resin.

Aspect (6): The present invention also provides an ink composition for printing on metal according to Aspect (5), wherein the alkyd resin is a coconut oil-modified alkyd resin.

Advantageous Effects of the Invention

The present invention provides an ink composition for printing on metal which has superior properties in terms of a reduction in repellency and improvements in flowability and misting even when a water-based overprint varnish containing reduced amounts of solvent ingredients is applied onto the printed surface with the ink composition.

EMBODIMENTS OF THE INVENTION

One embodiment of the ink composition for printing on metal of the present invention (hereafter, appropriately abbreviated as "inventive ink composition") will now be described below. It should be noted that the present invention is not limited to the following embodiments, and can be implemented with appropriate modifications within the scope of the present invention.

The inventive ink composition can be used in printing on metal, and is preferably applicable to printing through a so-called dry offset printing process with a letterpress plate as a printing plate or an offset printing process with a lithographic plate as a printing plate, that is, applicable to all printing processes which are generally employed in printing on metal. Since the inventive ink composition can prevent the repellency of water-based overprint varnish (OP varnish) applied thereon even when a water-based OP varnish is applied in a wet-on-wet manner immediately after printing with the ink composition, the inventive ink composition is preferably applicable to printing or coating process employed in not only a two-piece can printing but also a three-piece can printing. The inventive ink composition can prevent the repellency even when a water-based OP varnish having reduced amounts of solvent ingredients is applied in a wet-on-wet manner, and has superior flowability of the composition itself, resulting in decreases in drawbacks, such as backing-away.

The inventive ink composition includes a coloring pigment, resins, and a solvent, wherein the ink composition is characterized by comprising a rosin-modified resin having an acid value of 10 to 400 mg KOH/g as at least one part of the resins, and at least one compound selected from the group consisting of compounds represented by general formula (1) as the solvent.

[Formula 1]

$$R-O-(AO)_{\overline{m}}-H \tag{1}$$

The inventive ink composition may also contain an alkyd resin as another resin in addition to these ingredients. Each ingredient will be described below.

[Resin]

The inventive ink composition contains a rosin-modified resin having an acid value of 10 to 400 mg KOH/g. The inventive ink composition has high polarity probably due to inclusion of such rosin-modified resin having a high acid value, and has high affinity for water-based OP varnish, which also has high polarity. Based on such a mechanism, it is speculated that the repellency does not occur even in applying in a wet-on-wet manner.

A rosin-modified resin is prepared with rosin as one of the raw materials. The rosin contains a mixture of resin acids, such as abietic acid, palustric acid, isopimaric acid and levopimaric acid, and these resin acids contain hydrophilic and chemically active carboxyl groups, some of which have conjugated double bonds. Accordingly, various rosin-modified resins are prepared by condensation polymerization combining polyhydric alcohols and polybasic acids; the addition of resol, which is a phenolic condensate, to benzene rings contained in the rosin skeleton; and the addition of a maleic acid or maleic anhydride skeleton through Diels-Alder reaction with maleic anhydride or maleic acid as a dienophile. Various types of such rosin-modified resins are commercially available, and can be procured to be used.

Examples of rosin-modified resins include maleated rosins, fumarated rosins, rosin-modified maleic acid resins, rosin-modified fumaric acid resins, rosin-modified phenolic resins, rosin-modified alkyd resins, and rosin-modified polyester resins. In the present invention, the polarity based on the acid value of rosin-modified resin is an important factor, and any rosin-modified resin may be used, although a preferred resin among various rosin-modified resins contains a portion derived from at least one selected from the group consisting of maleic acid, maleic anhydride, fumaric acid and fumaric anhydride in its structure. A resin that "contains a portion derived from at least one selected from the group consisting of maleic acid, maleic anhydride, fumaric acid and fumaric anhydride in its structure" is prepared with at least one selected from the group consisting of maleic acid, maleic anhydride, fumaric acid, and fumaric anhydride as part of raw materials. For example, such a resin indicates rosin-modified maleic resin or rosin-modified fumaric acid resin prepared through condensation polymerization of maleic acid or fumaric acid as part of polybasic acid; maleated rosin or fumarated rosin having a structure constructed by addition of maleic acid, maleic anhydride, fumaric acid, or fumaric anhydride as a dienophile through Diels-Alder reaction; or a resin prepared through further polymerization of other chemical species with functional groups contained in the above raw materials.

The rosin-modified resin has an acid value of 10 to 400 mg KOH/g, preferably 20 to 400 mg KOH/g, more preferably 100 to 300 mg KOH/g, and further more preferably 150 to 300 mg KOH/g. Such a preferred range of acid value of the rosin-modified resin can achieve compatibility between two print characteristics, i.e., prevention of repellency in applying OP varnish in a wet-on-wet manner and prevention of misting and backing-away.

The rosin-modified resin is heated to be dissolved or dispersed in solvents described later, and then used in a state of varnish. In the production of the varnish, a di- or higher valent metal alkoxy compound is preferably added as a gelling agent to the resulting varnish solution or dispersion to form a gelled varnish. It is preferred that the use of gelled varnish produced from a rosin-modified resin in the preparation of an ink composition can impart appropriate viscoelasticity to the ink composition, achieve an improvement in flowability and a reduction in misting, and form a tougher cured film.

The content of the rosin-modified resin in the ink composition is preferably 5 to 50 mass %, more preferably 5 to 40 mass %, and further more preferably 8 to 40 mass % to the entire composition.

The inventive ink composition preferably contains an alkyd resin in addition to the rosin-modified resin. The alkyd resin is a condensed polymer of polyhydric alcohol with polybasic acid, which is a polyester, and may also be prepared through additional condensation polymerization with animal or vegetable oil and/or fatty acid therefrom. In this reaction, the animal or vegetable oil is trans-esterified with polyhydric alcohol to form the fatty acid, which are then incorporated into the structure of alkyd resin. The proportion of the fatty acid derived from the animal or vegetable oil in the alkyd resin is referred to as "oil length," and the oil length of the alkyd resin used in the present invention is preferably 20 to 50 mass %. An oil-free alkyd resin, which is an alkyd resin that does not contain fatty acid ingredients of animal or vegetable oils, may also be used.

Although various alkyd resins can be used in the present invention, a coconut oil-modified alkyd resin is preferably used. It is preferred that the use of coconut oil-modified alkyd resin as the alkyd resin can lead to improved dispersion stability in the ink composition and superior hue with high transparency.

The content of the alkyd resin in the ink composition is preferably 10 to 40 mass %, more preferably 10 to 30 mass %, and further more preferably 15 to 25 mass % to the entire composition.

In the inventive ink composition, conventional resins can be used in addition to the rosin-modified resins and alkyd resins described above. In other words, known resins compatible with the above rosin-modified resins and alkyd resins may be used alone or in combination depending on the required characteristics, such as printability and physical properties of coated film. Examples of such resins include polyester resins, petroleum resins, epoxy resins, ketone resins, amino resins, and benzoguanamine resins.

[Solvent]

The inventive ink composition contains at least one compound selected from the group consisting of compounds represented by general formula (1) as solvent. Thereafter, at least one compound selected from the group consisting of compounds represented by general formula (1) is also referred to as a specific solvent.

[Formula 1]

$$R\!-\!O\!-\!(AO)_{\overline{n}}\!-\!H \qquad (1)$$

In general formula (1), each A is independently determined and is an alkylene group having 2 to 4 carbon atoms which may have a branch structure. Examples of such alkylene groups include an ethylene group $[\!-\!(CH_2)_2\!-\!]$, a propylene group $[\!-\!CH_2(CH_3)\!-\!CH_2\!-\!$ or $-\!CH_2CH_2(CH_3)\!-\!]$, a trimethylene group $[\!-\!(CH_2)_3\!-\!]$, and an iso-propylidene group $[\!-\!C(CH_3)_2\!-\!]$.

In general formula (1), R is an alkyl group having 1 to 13 carbon atoms which may have a branch structure and/or a ring structure. In addition, this alkyl group may be not only an aliphatic group but also an alicyclic group. Examples of such alkyl groups include methyl, ethyl, propyl, isopropyl, butyl, hexyl, 2-ethylhexyl, octyl, decyl, and cyclohexyl groups.

In general formula (1), n is an integer of 2 to 6. An n of 2 or more can sufficiently stabilize the ink composition on a printing machine and keep a sufficient boiling point of the specific solvent, which value is preferred. An n of 6 or less can have a suitable viscosity as a solvent of the ink composition.

Examples of the compounds represented by general formula (1) include dipropylene glycol monomethyl ether, dipropylene glycol monobutyl ether, dipropylene glycol monooctyl ether, dipropylene glycol tridecyl ether, tripropylene glycol monobutyl ether, tripropylene glycol monodecyl ether, tetrapropylene glycol monohexyl ether, pentapropylene glycol monobutyl ether, and hexapropylene glycol monomethyl ether.

The content of the specific solvent in the inventive ink composition is preferably 20 to 40 mass %, more preferably 23 to 40 mass % to the entire composition. It is preferred that a specific solvent content of 20 mass % or more to the entire composition can effectively prevent the repellency when the water-based OP varnish is applied in a wet-on-wet manner.

[Coloring Pigment]

Coloring pigments are ingredients for imparting coloration strength to the ink composition. The coloring pigments include, but are not limited to, organic and/or inorganic pigments commonly employed in ink compositions for printing.

Examples of such coloring pigments include yellow pigments, such as Disazo Yellows (Pigment Yellow 12, Pigment Yellow 13, Pigment Yellow 17, and Pigment Yellow 1) and Hansa Yellow; magenta pigments, such as Brilliant Carmine 6B, Lake Red C, and Watching Red; cyan pigments, such as phthalocyanine blue, phthalocyanine green, and alkali blue; black pigments, such as carbon black; and fluorescent pigments. In the present invention, the coloring pigments also include metal powder pigments for imparting metal colors, such as gold and silver, to ink compositions. Examples of such metal powder pigments include gold powder, bronze powder, aluminum paste which aluminum powder is processed into a paste, and mica powder.

The coloring pigments are contained in an amount of, for example, about 5 to 50 mass % of the entire ink composition, although such an amount is not essential. In the case that yellow pigments, magenta pigments, cyan pigments, and black pigments are used to prepare yellow ink compositions, magenta ink compositions, cyan ink compositions, and black ink compositions, respectively, pigments of other colors may be used together or ink compositions of other colors may be added as complementary color ingredients.

[Other Ingredients]

In the inventive ink composition, other ingredients, such as known curing agents, pigment dispersants, solvents other than the specific solvent described above, waxes and stabilizers, may be added as needed.

Curing agents may be used such as amino resins, for example, melamine resins and benzoguanamine resins.

Examples of such solvents other than the specific solvent include aliphatic hydrocarbons or alicyclic hydrocarbons, aromatic hydrocarbons such as alkylbenzene, and higher alcohols, each having a boiling point range of 230 to 400° C.

The inventive ink composition may be prepared by mixing each ingredient, such as a coloring pigment, a resin, and a solvent containing a specific solvent, with a roll mill, a ball mill, or a bead mill in a conventional process. The ink composition has a viscosity of 10 to 70 Pa·s measured with a Laray viscometer at 25° C., although such a value is not essential.

Examples of metals used in printing on metal with the inventive ink compositions include, but not limited to, zinc-coated or tin-coated iron plates, aluminum plates, or metal cans made of these metal materials.

Varnishes commonly used can be employed as a water-based OP varnish to be applied onto the printed surfaces with ink compositions. In particular, the water-based OP varnish may be prepared in combination with water-based acrylic resins, water-based polyester resins, water-based alkyd resins, water-based epoxy resins, or two or more of these modified resins as binder resins, and amino resins as curing agents.

The printing on the surfaces of metal materials with the ink composition and water-based OP varnish may be performed according to the following steps: the inventive ink composition is initially printed with a dry offset printing machine or an offset printing machine; and the water-based OP varnish is then overcoated on the undried surface of the ink composition with a coater, followed by baking at 150 to 280° C. for several seconds to several minutes.

EXAMPLES

The inventive ink composition will be described in more detail along with the illustration of examples, although the present invention is not limited to the following examples.
[Synthesis of Alkyd Resin A]

A mixture of neopentyl glycol (17.4 parts by mass), pentaerythritol (23.0 parts by mass), coconut oil fatty acid (22.2 parts by mass), isophthalic acid (36.8 parts by mass) and terephthalic acid (7.01 parts by mass) were heated at 230° C. in a nitrogen atmosphere for the first stage of esterification, and trimellitic anhydride (4.7 parts by mass) was then added and heated at 155° C. in a nitrogen atmosphere for the second stage of esterification. These reactions of esterification were carried out in accordance with a conventional process to yield alkyd resin A having an acid value of 34.0 mg KOH/g, an oil length of 23.5, a weight average molecular weight of 3,530, and a number average molecular weight of 490. This resin is called Resin A.
[Synthesis of Alkyd Resin B]

A mixture of pentaerythritol (29.4 parts by mass), coconut oil fatty acid (44.4 parts by mass), isophthalic acid (28.8 parts by mass), titanium (IV) butoxide (0.09 parts by mass) and xylene (3.0 parts by mass) were heated at 230° C. in a nitrogen atmosphere for the first stage of esterification, and trimellitic anhydride (4.5 parts by mass) was then added and heated at 170° C. in a nitrogen atmosphere for the second stage of esterification. These reactions of esterification were carried out in accordance with a conventional process to yield alkyd resin B having an acid value of 29.2 mg KOH/g, an oil length of 47.0, a weight average molecular weight of 23,120 and a number average molecular weight of 755. This resin is called Resin B.
[Preparation of Varnish 1]

A mixture of maleated rosin resin having an acid value of 205.5 mg KOH/g, a weight average molecular weight of 536, a number average molecular weight of 312, and a softening point of 108° C. or less (51.9 parts by mass) and tripropylene glycol monobutyl ether (30.1 parts by mass) was heated at 130° C. for one hour to dissolve the mixture and then yield Varnish 1. Varnish 1 is a varnish solution of maleated rosin resin having an acid value of 205.5 mg KOH/g.
[Preparation of Varnish 2]

A mixture of maleated rosin resin having an acid value of 205.5 mg KOH/g, a weight average molecular weight of 536, a number average molecular weight of 312, and a softening point of 108° C. or less (51.9 parts by mass) and tripropylene glycol monobutyl ether (30.1 parts by mass) was heated with stirring at 130° C. for one hour to dissolve the mixture, and aluminum ethyl acetoacetate diisopropylate (ALCH; 1.3 parts by mass) was then added, followed by heating with stirring at 130° C. for 40 minutes for gelation to yield Varnish 2. Varnish 2 is a gelled varnish of maleated rosin resin having an acid value of 205.5 mg KOH/g.
[Preparation of Varnish 3]

A mixture of maleated rosin resin having an acid value of 205.5 mg KOH/g, a weight average molecular weight of 536, a number average molecular weight of 312, and a softening point of 108° C. or less (51.9 parts by mass) and polyalkylene glycol monobutyl ether (in general formula (1), R is a butyl group, n is 4 where two ethylene groups ($—CH_2CH_2—$) are contained in A and two propylene groups ($—CH_2(CH_3)CH—$) are contained in A; 30.1 parts by mass) was heated with stirring at 130° C. for one hour to dissolve the mixture, and aluminum ethyl acetoacetate diisopropylate (ALCH; 1.3 parts by mass) was then added, followed by heating with stirring at 130° C. for 40 minutes for gelation to yield Varnish 3. Varnish 3 is a gelled varnish of maleated rosin resin having an acid value of 205.5 mg KOH/g.
[Preparation of Varnish 4]

A mixture of maleated rosin resin having an acid value of 205.5 mg KOH/g, a weight average molecular weight of 536, a number average molecular weight of 312, and a softening point of 108° C. or less (51.9 parts by mass) and diethylene glycol monohexyl ether (25.1 parts by mass) was heated with stirring at 130° C. for one hour to dissolve the mixture, and aluminum ethyl acetoacetate diisopropylate (ALCH; 1.3 parts by mass) was then added, followed by heating with stirring at 130° C. for 40 minutes for gelation to yield Varnish 4. Varnish 4 is a gelled varnish of maleated rosin resin having an acid value of 205.5 mg KOH/g.
[Preparation of Varnish 5]

A mixture of maleated rosin resin having an acid value of 26.1 mg KOH/g, a weight average molecular weight of 53,224, a number average molecular weight of 1,001, and a softening point of 133 to 143° C. (51.9 parts by mass) and alkylbenzene (available from Formosan Union Chemical Corp., product name LAB; 63.1 parts by mass) was heated with stirring at 130° C. for one hour to dissolve the mixture, and aluminum ethyl acetoacetate diisopropylate (ALCH; 0.65 parts by mass) was then added, followed by heating with stirring at 130° C. for 40 minutes for gelation to yield Varnish 5. Varnish 5 is a gelled varnish of maleated rosin resin having an acid value of 26.1 mg KOH/g, which contains no specific solvent.

[Preparation of Varnish 6]

A mixture of maleated rosin resin having an acid value of 26.1 mg KOH/g, a weight average molecular weight of 53,224, a number average molecular weight of 1,001, and a softening point of 133 to 143° C. (51.9 parts by mass) and tripropylene glycol monobutyl ether (53.1 parts by mass) was heated with stirring at 130° C. for one hour to dissolve the mixture, and aluminum ethyl acetoacetate diisopropylate (ALCH; 0.65 parts by mass) was then added, followed by heating with stirring at 130° C. for 40 minutes for gelation to yield Varnish 6. Varnish 6 is a gelled varnish of maleated rosin resin having an acid value of 26.1 mg KOH/g.

[Preparation of Varnish 7]

A mixture of maleated rosin resin having an acid value of 202.5 mg KOH/g, a weight average molecular weight of 865, a number average molecular weight of 375, and a softening point of 100 to 120° C. (51.9 parts by mass) and tripropylene glycol monobutyl ether (40.1 parts by mass) was heated with stirring at 130° C. for one hour to dissolve the mixture, and aluminum ethyl acetoacetate diisopropylate (ALCH; 1.3 parts by mass) was then added, followed by heating with stirring at 130° C. for 40 minutes for gelation to yield Varnish 7. Varnish 7 is a gelled varnish of maleated rosin resin having an acid value of 202.5 mg KOH/g.

[Preparation of Varnish 8]

A mixture of maleated rosin resin having an acid value of 194.7 mg KOH/g, a weight average molecular weight of 2,120, a number average molecular weight of 506, and a softening point of 155 to 170° C. (51.9 parts by mass) and tripropylene glycol monobutyl ether (54.6 parts by mass) was heated with stirring at 130° C. for one hour to dissolve the mixture, and aluminum ethyl acetoacetate diisopropylate (ALCH; 1.3 parts by mass) was then added, followed by heating with stirring at 130° C. for 40 minutes for gelation to yield Varnish 8. Varnish 8 is a gelled varnish of maleated rosin resin having an acid value of 194.7 mg KOH/g.

[Preparation of Varnish 9]

A mixture of maleated rosin resin having an acid value of 171.0 mg KOH/g, a weight average molecular weight of 4,335, a number average molecular weight of 554, and a softening point of 145 to 160° C. (51.9 parts by mass) and tripropylene glycol monobutyl ether (59.5 parts by mass) was heated with stirring at 130° C. for one hour to dissolve the mixture, and aluminum ethyl acetoacetate diisopropylate (ALCH; 1.3 parts by mass) was then added, followed by heating with stirring at 130° C. for 40 minutes for gelation to yield Varnish 9. Varnish 9 is a gelled varnish of maleated rosin resin having an acid value of 171.0 mg KOH/g.

Comparative Example 1 and Examples 1 to 7

Ink compositions of Comparative Example 1 and Examples 1 to 7, which contain alkyd resin B (Resin B), were prepared in accordance with the formulations shown in Table 1. In the preparation of the ink compositions, all the ingredients were mixed and then kneaded in a roll mill heated to 40° C. The specific solvent used in the preparation of the ink compositions shown in Table 1 is tripropylene glycol monobutyl ether.

Comparative Example 2 and Examples 8 to 14

Ink compositions of Comparative Example 2 and Examples 8 to 14, which contain alkyd resin A (Resin A), were prepared in accordance with the formulations shown in Table 2. In the preparation of the ink compositions, all the ingredients were mixed and then kneaded in a roll mill heated to 40° C. The specific solvent used in the preparation of the ink compositions shown in Table 2 is tripropylene glycol monobutyl ether.

Examples 15 to 19

Ink compositions of Examples 15 to 19, which contain no alkyd resin, were prepared in accordance with the formulations shown in Table 3. In the preparation of the ink compositions, all the ingredients were mixed and then kneaded in a roll mill heated to 40° C. The specific solvent used in the preparation of the ink compositions shown in Table 3 is tripropylene glycol monobutyl ether.

Each formulation shown in Tables 1 to 3 is based on parts by mass. In Tables 1 to 3, "coloring pigment" is phthalocyanine blue 15:3, "neutralizing agent" is dibutylamine, and "curing agent" is a full ether-type methylated melamine resin (available from Allnex GMBH, Cymel 303LF).

[Evaluation of Flowability]

For each of the ink compositions in Examples and Comparative Examples, the flow value was measured with a spread meter, and the flowability was evaluated using the flow slope value. The flow slope value is given by subtracting the spread diameter in mm measured after 10 seconds from the spread diameter in mm measured after 100 seconds with the spread meter, and a larger flow slope value indicates higher flowability. The criteria for evaluation are as follows, and the results are shown in the column "Flowability" of Tables 1 to 3.

A: The flow slope value is 4.0 or more.

B: The flow slope value is 2.0 to less than 4.0.

C: The flow slope value is less than 2.0.

[Evaluation of Repellency of Water-Based OP Varnish]

For each of the ink compositions in Examples and Comparative Examples, a water-based OP varnish was applied onto the coated film of the ink composition that had been spread on a metal strip, and the presence or absence of repellency or penetration of the water-based OP varnish applied was visually observed for evaluation. The criteria for evaluation are as follows, and the results are shown in the column "Repellency" of Tables 1 to 3.

A: No repellency and good gloss are observed.

B: Almost no repellency and slightly reduced gloss are observed (no problems for practical use).

C: Repellency and penetration of OP varnish are observed.

[Evaluation of Misting Resistance]

For each of the ink compositions in Examples and Comparative Examples, 1.3 cc of the ink composition was applied onto a rotating roller in an inkometer, evenly smoothed, and then rotated at 1,200 rpm for one minute. During the rotation, a blank sheet of paper was placed beneath the roller to measure the degree of misting thereon. The measurement was carried out while holding the roller at 30° C. The criteria for evaluation are as follows, and the results are shown in the column "Misting resistance" of Tables 1 to 3.

S: Change in mass of the blank sheet of paper is less than 20 mg before and after the measurement.

A: Change in mass of the blank sheet of paper is 20 mg to less than 40 mg before and after the measurement.

B: Change in mass of the blank sheet of paper is 40 mg to less than 60 mg before and after the measurement.

C: Change in mass of the blank sheet of paper is 60 mg or more before and after the measurement.

[Pencil Hardness]

For each of the ink compositions in Examples and Comparative Examples, 0.1 cc of the ink composition was spread on an aluminum strip with an RI tester (manufactured by Akira Seisakusho Co., Ltd.) having four-split roll, and the resulting spread strips were heated in an electric oven at 200° C. for two minutes. The spread strips were then cooled to room temperature, and the pencil hardness on surfaces of the spread strips was measured in accordance with JIS K5600. The results are shown in the column "Pencil hardness" of Tables 1 to 3.

TABLE 1

| | Comparative Example 1 | Example 1 | Example 2 | Example 3 | Example 4 | Example 5 | Example 6 | Example 7 |
|---|---|---|---|---|---|---|---|---|
| Resin A | 36.91 | 36.91 | 36.91 | 36.91 | 36.91 | 36.91 | 36.91 | 36.91 |
| Varnish 1 | | 20.00 | | | | | | |
| Varnish 2 | | | 20.00 | | | | | |
| Varnish 3 | | | | 20.00 | | | | |
| Varnish 4 | | | | | 20.00 | | | |
| Varnish 7 | | | | | | 20.00 | | |
| Varnish 8 | | | | | | | 20.00 | |
| Varnish 9 | | | | | | | | 20.00 |
| Specific solvent | 24.25 | 22.25 | 22.25 | 22.25 | 22.25 | 22.25 | 22.25 | 23.25 |
| Coloring pigment | 28.00 | 28.00 | 28.00 | 28.00 | 28.00 | 28.00 | 28.00 | 28.00 |
| Total | 89.16 | 107.16 | 107.16 | 107.16 | 107.16 | 107.16 | 107.16 | 108.16 |
| Content of specific solvent (%) | 27.2 | 27.6 | 27.5 | 27.5 | 26.7 | 28.7 | 30.1 | 31.1 |
| Flowability | C | A | A | A | A | A | A | A |
| Repellency | B | A | A | A | A | A | A | A |
| Misting resistance | B | B | A | A | A | A | A | B |
| Pencil hardness | F | F | H | H | H | F | F | F |

TABLE 2

| | Comparative Example 2 | Example 8 | Example 9 | Example 10 | Example 11 | Example 12 | Example 13 | Example 14 |
|---|---|---|---|---|---|---|---|---|
| Resin B | 19.86 | 19.86 | 19.86 | 19.86 | 19.86 | 19.86 | 19.86 | 19.86 |
| Varnish 2 | | 20.00 | | | | 10.00 | | |
| Varnish 5 | | | | | | | 20.00 | |
| Varnish 6 | | | | | | | | 20.00 |
| Varnish 7 | | | 20.00 | | | | | |
| Varnish 8 | | | | 20.00 | | | | |
| Varnish 9 | | | | | 20.00 | 10.00 | | |
| Neutralizing agent | 2.48 | 2.48 | 2.48 | 2.48 | 2.48 | 2.48 | 2.48 | 2.48 |
| Curing agent | 14.19 | 14.19 | 14.19 | 14.19 | 14.19 | 14.19 | 14.19 | 14.19 |
| Specific solvent | 23.54 | 18.54 | 18.54 | 18.54 | 18.54 | 18.54 | 18.54 | 18.54 |
| Coloring pigment | 28.00 | 28.00 | 28.00 | 28.00 | 28.00 | 28.00 | 28.00 | 28.00 |
| Total | 88.06 | 103.06 | 103.06 | 103.06 | 103.06 | 103.06 | 103.06 | 103.06 |
| Content of Specific solvent (%) | 26.7 | 25.0 | 26.2 | 27.7 | 28.1 | 26.6 | 18.0 | 27.7 |
| Flowability | C | A | A | A | A | A | A | B |
| Repellency | A | A | A | A | A | A | B | A |
| Misting resistance | B | A | A | S | S | S | S | S |
| Pencil hardness | 2H | 2H | 3H | 2H | 2H | 3H | 2H | 2H |

TABLE 3

| | Example 15 | Example 16 | Example 17 | Example 18 | Example 19 |
|---|---|---|---|---|---|
| Varnish 2 | 55.00 | | | | 20.00 |
| Varnish 7 | | 55.00 | | | |
| Varnish 8 | | | 55.00 | | |
| Varnish 9 | | | | 55.00 | 55.00 |
| Coloring pigment | 28.00 | 28.00 | 28.00 | 28.00 | 28.00 |
| Total | 83.00 | 83.00 | 83.00 | 83.00 | 103.00 |
| Content of Specific solvent (%) | 23.9 | 28.1 | 33.1 | 34.6 | 34.9 |
| Flowability | A | A | A | A | A |
| Repellency | A | A | A | A | A |
| Misting resistance | A | A | S | S | S |
| Pencil hardness | 3H | H | H | 2H | 2H |

Tables 1 to 3 illustrate that the inventive ink compositions can achieve compatibility between improved flowability of the ink compositions and prevention of repellency of the water-based OP varnish in comparison to the ink compositions of Comparative Examples. In particular, the comparison of Comparative Example 1 with Example 1 in Table 1 illustrates that both the flowability of the ink compositions and the repellency of the water-based OP varnish can be improved through compounding with maleated rosin, which is a rosin-modified resin. In addition, the comparison of Example 1 with Example 2 illustrates that the use of maleated rosin, which is a rosin-modified resin, in the form of gelled varnish can enhance the misting resistance and pencil hardness. Furthermore, the comparison of Examples 13 with Example 14 in Table 2 illustrates that an increase in amount of the added specific solvent results in more improved repellency of the water-based OP varnish. Based on this result, it is concluded that the amount of the added specific solvent should be preferably about 20 mass % or more to the entire composition.

The invention claimed is:

1. An ink composition for printing on metal including a coloring pigment, resins, and a solvent,
    wherein the ink composition has a viscosity of 10 to 70 Pa·s measured with a Laray viscometer at 25° C.;
    wherein the ink composition contains a rosin-modified resin having an acid value of 10 to 400 mg KOH/g as at least part of the resins, and the solvent contains at least one compound selected from the group consisting of compounds represented by the following formula (1):

$$R - O + AO )_{\overline{n}} H \tag{1}$$

wherein each A is independently an alkylene group having 2 to 4 carbon atoms that may have a branch structure, R is an alkyl group having 1 to 13 carbon atoms that may have a branch structure and/or a ring structure, and n is an integer of 2 to 6.

2. The ink composition for printing on metal according to claim 1, wherein the rosin-modified resin is in the form of a gelled varnish together with the solvent and a di- or higher valent metal alkoxy compound in the ink composition.

3. The ink composition for printing on metal according to claim 1, wherein the solvent is 20 mass % or more of the entire ink composition.

4. The ink composition for printing on metal according to claim 1, wherein the rosin-modified resin contains a portion in the structure thereof derived from at least one selected from the group consisting of maleic acid, maleic anhydride, fumaric acid, and fumaric anhydride.

5. The ink composition for printing on metal according to claim 1, wherein the ink composition further contains an alkyd resin.

6. The ink composition for printing on metal according to claim 5, wherein the alkyd resin is a coconut oil-modified alkyd resin.

* * * * *